E. W. QUINCY.
SEED-PLANTER.
No. 185,190. Patented Dec. 12, 1876.
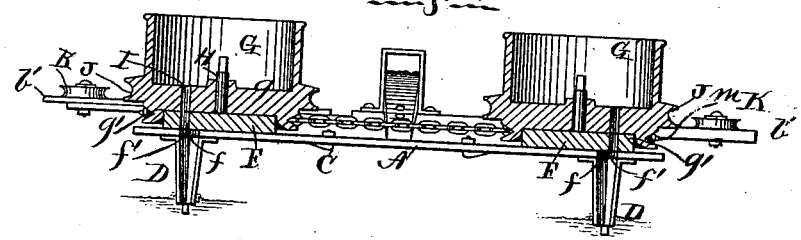
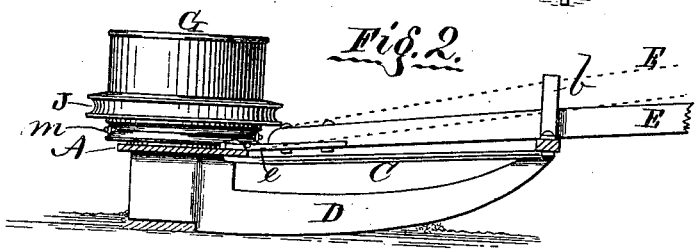
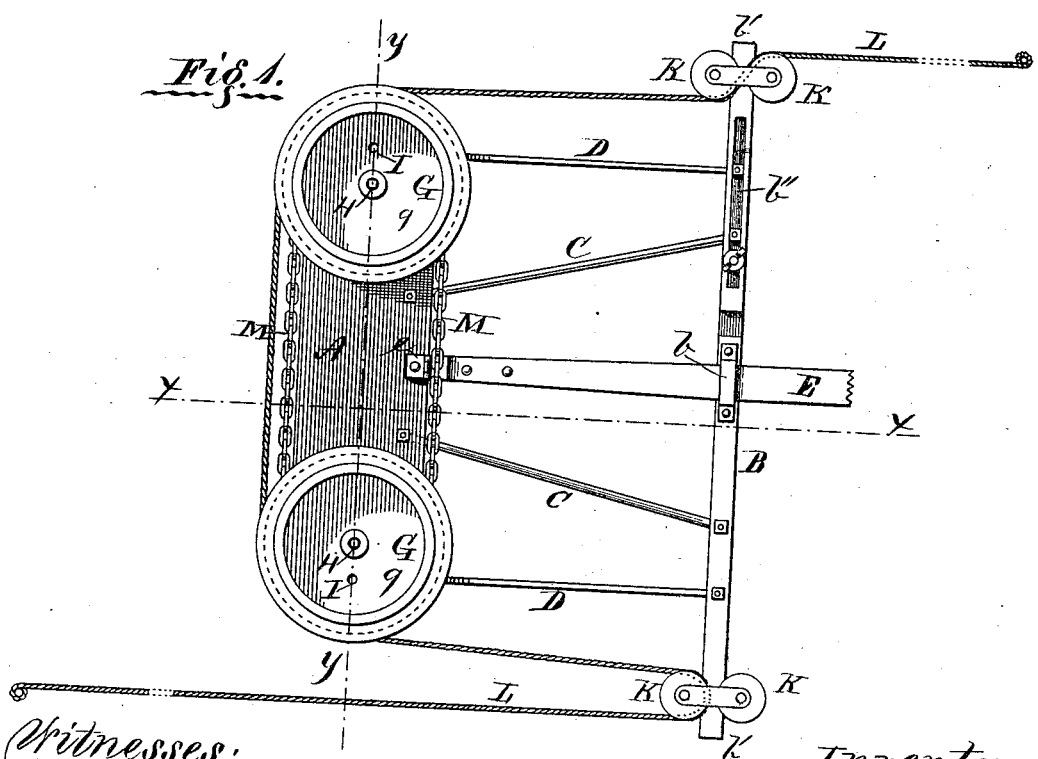
Witnesses:
M. H. Barringer
Platt R. Richards
Inventor:
Edmund W. Quincy
By W. B. Richards, Atty.

UNITED STATES PATENT OFFICE.

EDMUND W. QUINCY, OF PEORIA, ILLINOIS, ASSIGNOR OF ONE-HALF HIS RIGHT TO JOHN Y. MILLS, OF SAME PLACE.

IMPROVEMENT IN SEED-PLANTERS.

Specification forming part of Letters Patent No. 185,190, dated December 12, 1876; application filed August 23, 1876.

*To all whom it may concern:*

Be it known that I, EDMUND W. QUINCY, of Peoria, in the county of Peoria and State of Illinois, have invented certain new and useful Improvements in Seed-Planters; and I do hereby declare that the following is a full, clear, and exact description thereof, which will enable others skilled in the art to which it appertains to make and use the same, reference being had to the accompanying drawings, and to letters of reference marked thereon, which form a part of this specification.

This invention relates to improvements in seed-planting machines; and the invention consists in certain new and improved devices and combinations of devices, whereby the operation of such machines is rendered more certain and effective, as hereinafter more fully set forth.

Figure 1 in the drawings is a top view of my improvements, and of the forward frame of an ordinary seed-planter of the class made of two frames hinged to each other, and the forward frame carrying the seeding devices, and supported on not less than two runners, while the rear frame is supported on wheels. Fig. 2 is a sectional view in the plane of the line $x\,x$ in Fig. 1. Fig. 3 is a sectional view in the line $y\,y$ in Fig. 1.

Referring to the parts by letters, A represents the rear and B the front cross-bars, and C C the braces, supported on runners or furrow-openers D D, and constituting the forward frame of an ordinary seed-planter. E represents the tongue, attached to the bar A by a flexible plate, $e$, and to the bar B by a yoke, $b$, which permit the tongue, and also the frame to which it is attached, to vibrate vertically and independently of each other. (See dotted lines at Fig. 2.) F F are circular disks, mounted, one on each end of the bar A, and are pierced with holes $f$, which correspond with holes $f'$ in the bar A, and constitute the seed-passages to the throat of the seed-tubes $d$, formed by the opened rear ends of the runners D. G G are the seed boxes or hoppers, with recesses above their bottoms $g$ for the seed, and circular recesses $g'$ below their bottoms, and which fit over the disks F.

The bottoms $g$ rest upon the disks F. H is a center-post, projecting upwardly and centrally through the bottom $g$ from the disk F, and may be utilized to secure the hopper in place. I is the seed-cup—a perforation in the bottom $g'$—from which the seed drops through the openings $f\,f'$ whenever the cup I is brought coincident with said openings by the rotation in horizontal planes of the hoppers G. J is a grooved circumferential flange on the periphery of each hopper G.

The ends $b'$ of the bar B are extended laterally, as shown at Fig. 1, and have two pulleys, K K, mounted on each end $b'$. For convenience in passing through gates, &c., the ends $b'$ may be made retractile, as shown at the left-hand side of Fig. 1, by using a detached end, $b'$, having a slot, $b''$, through which a set-screw passes into the bar B, and by means of which the bar $b'$ may be retracted in the obvious manner.

L is the operating-cord, stretched along the line of planting—across the field, if long enough—and staked fast at each end, and passed around the pulleys K and grooves J on the hoppers G, as shown at Fig. 1, so that, as the machine is advanced, the hoppers will be rotated by the cord L, the pulleys K serving as guides for the cord L, and also for keeping the machine in proper relation thereto after turning and starting back in the rows of corn, following the last made. M is an auxiliary cord or chain passed around circumferential grooves $m$ in the bottoms of the hoppers G, and connecting them, for the purpose, if found necessary, of insuring uniformity in their revolutions and seed-dropping.

Having thus described my invention, what I claim as new, and desire to secure by Letters Patent, is—

1. The combination, in a seed-planting machine, of the following instrumentalities, viz: cords L and hoppers G, the cords L stretched over the ground to be planted, and arranged to operate upon the hoppers G without any intermediate devices, substantially as and for the purpose specified.

2. The combination, in a seed-planting machine, of the following instrumentalities: the hoppers G, cords L, pulleys K, and bars B, substantially as and for the purpose specified.

3. The cord or chain M, combined with the hoppers G and cord L, substantially as and for the purpose specified.

In testimony that I claim the foregoing as my own I affix my signature in presence of two witnesses.

EDMUND W. QUINCY.

Witnesses:
H. W. WELLS,
J. M. MORSE.